G. H. BARKER.
KITCHEN FURNITURE.
APPLICATION FILED JUNE 19, 1913.
1,116,544.
Patented Nov. 10, 1914.
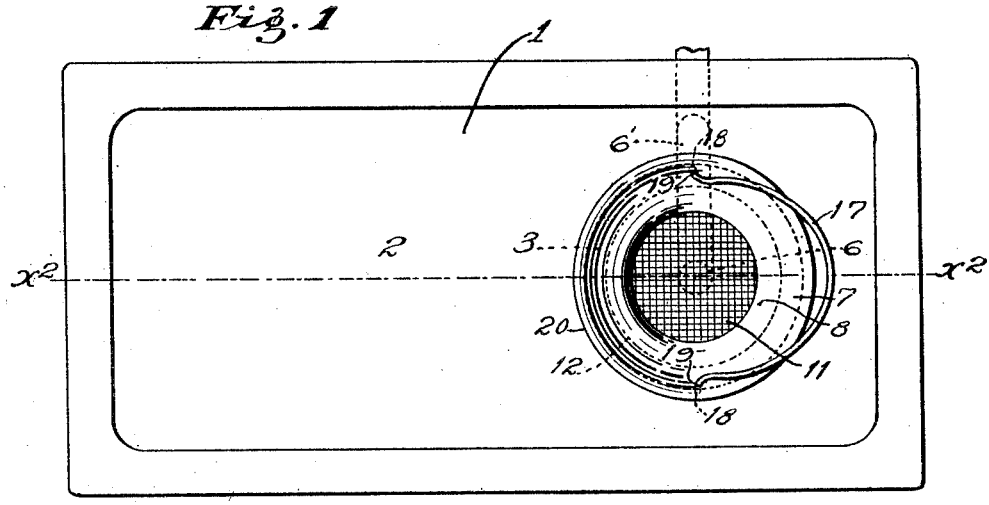
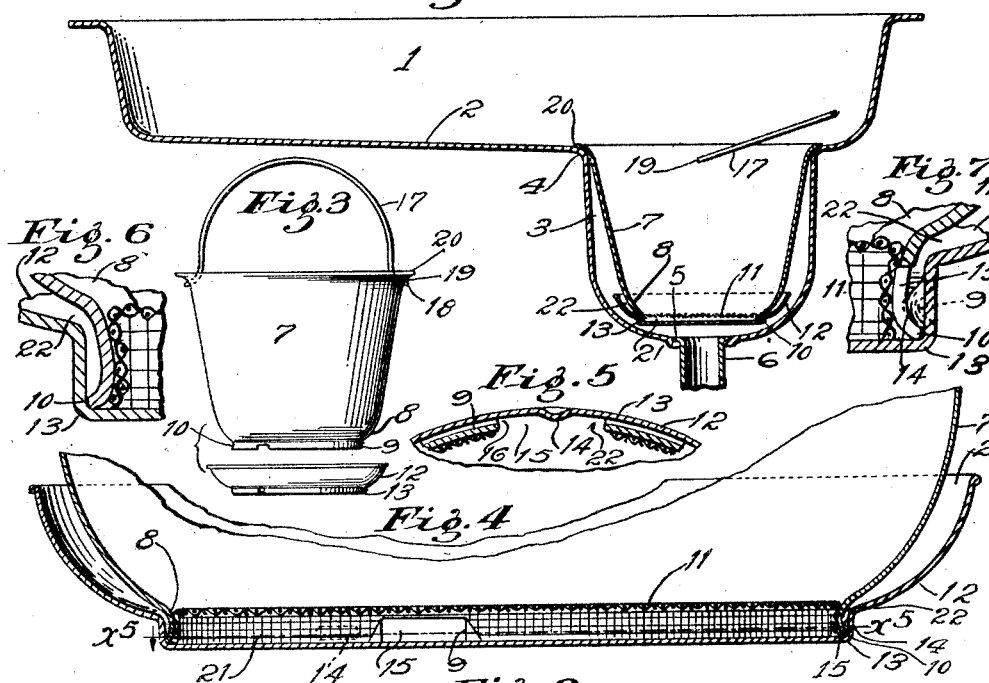
Witnesses
Thor Sjoberg
L. Belle Weaver
Inventor
George H. Barker
by
James R. Townsend
his atty.

UNITED STATES PATENT OFFICE.

GEORGE H. BARKER, OF PASADENA, CALIFORNIA, ASSIGNOR TO IMPROVED SANITARY FIXTURE COMPANY, OF LOS ANGELES, CALIFORNIA, A CORPORATION OF CALIFORNIA.

KITCHEN FURNITURE.

1,116,544.

Specification of Letters Patent.

Patented Nov. 10, 1914.

Application filed June 19, 1913. Serial No. 774,683.

*To all whom it may concern:*

Be it known that I, GEORGE H. BARKER, a citizen of the United States, residing at Pasadena, in the county of Los Angeles and State of California, have made new and useful Improvements in Kitchen Furniture, of which the following is a specification.

The object of this invention is to provide means whereby the work at a kitchen sink can be performed with greater ease, facility and convenience, and to minimize the disagreeable features of such work, and to do this without any liability of clogging the drain pipe of the sink. Also to accomplish this in the simplest and most sanitary manner.

The invention involves various features, parts and combinations and is regarded as pioneer in that the floor of the kitchen sink pan is provided with a pit, and a portable, removable garbage holder is contained in the pit and practically forms an open-mouthed false bottom therefor or a closure for the mouth thereof and is adapted while in the pit to there receive refuse and to hold the same below the level of the floor of the kitchen sink so that it will be out of the way until a convenient time for its removal arrives.

A further pioneer feature resides in the combination of a portable garbage holder having a drainage floor, and a liquid holder in the form of a pan attached to and carried by the garbage holder and extending above the outlet from the garbage holder so as to form therewith a grease trap.

Other features, objects and advantages may appear from the subjoined detail description.

The invention may be variously constructed.

In my co-pending application Serial No. 736,416, filed Dec. 12, 1912, for kitchen sink utensil, patented of even date herewith, I have shown and claimed a portable garbage and grease separator comprising a pan, a receptacle seated therein and a detachable perforated bottom supported in the receptacle below the level of the top of the pan and above the floor thereof; and have also shown and claimed the garbage receptacle set forth herein comprising a wall open at the top and bottom only, means inside the wall to support a bottom, and a detachable perforated bottom supported by said means, such receptacle being seated in and attached to a pan which raises the water above the perforated bottom, the whole being portable for carrying out the garbage, and no claim is made herein to the subject matter of said application but the present invention includes improvements over such subject matter and novel combinations, features of construction and arrangements of parts which will be more fully described and pointed out in the appended claims.

The accompanying drawings illustrate the invention in the form at present deemed most desirable.

Figure 1 is a plan of a specimen of the newly invented kitchen furniture comprising a combined sink, garbage holder and grease trap ready for use. Fig. 2 is a longitudinal sectional elevation on line $x^2$, Fig. 1. Fig. 3 is an elevation of the portable combined garbage holder and liquid holder adapted to form and forming a grease trap; said holders being removed from the pit and detached from each other. Fig. 4 is an enlarged fragmental sectional elevation of the grease trap formed at the lower part of the garbage holder by parts connected together. Fig. 5 is a plan section on about the level of line $x^5$, Fig. 4 at a time when the liquid holder pan has just been applied to but has not been fastened to the garbage holder. Fig. 6 is an enlarged fragmental sectional elevation of a portion of the left side of Fig. 4 at the joint between the two holders. Fig. 7 is a corresponding elevation of the right side of Fig. 4. Fig. 8 is an enlarged fragmental elevational detail of the lower portion of the garbage holder and a portion of the liquid holder therein and detached therefrom.

The sink pan 1 may be of the ordinary construction except that the sloping floor 2 thereof is provided with a deep depression or discharging pit 3 having a rounded rim 4 at the lower portion of said floor 2 and having at its bottom, drainage means as the drain outlet 5 in which is secured a waste pipe 6, a fragment of which is shown, so that liquids from the floor 2 may drain freely and unobstructedly into the trap 6' which is of any ordinary construction. Mounted and preferably suspended within the pit 3 is a downwardly contracted hollow wall 7 constituting part of the garbage holder having a contraction 8 at its lower end which terminates in a channeled collar 9 having an outward bottom extension 10.

The drainage means at the bottom of the garbage holder comprises a strainer arranged as the floor of the garbage holder and is formed by a member 11 of perforated sheet material preferably pressed into an inverted cup and detachably inserted into the hollow wall 7 and supported by the contraction 8 and forming a screen for the outlet at the bottom of the garbage holder.

The liquid holder 12 is a pan having a contracted and depressed downward bottom extension 13 provided with inward indentations or projections 14 at intervals to pass through notches 15 that are spaced apart at corresponding intervals in the downwardly extending annularly channeled collar 9, the channel 16 of which is arranged to receive the inward indentations or projections 14 so that by inserting the collar of the garbage holder into the downward extension of the liquid holder and turning the two parts relatively, the liquid holder will be attached to the garbage holder; said garbage holder and liquid holder thus practically forming a single vessel suspended in the pit and provided with a bail 17 inserted into the garbage holder and secured thereto near the top thereof by extending the tips 18 of the bail through holes 19 of the garbage holder just below the flaring rim 20 thereof which is rounded over to fit upon the rounded rim 4 of the pit practically flush with the floor 2 of the sink pan. The bail is of such dimensions relative to the mouth of the hollow wall in which it is inserted (see Figs. 1 and 3) that when dropped over to one side, as shown in Fig. 2, it is held aslant by and projects above the rim of said hollow wall and above the floor of the sink pan, always in position to be readily grasped by the hand of the attendant without the necessity of such hand coming in contact with the contents of the sink or of the garbage holder.

When the liquid holder and garbage holder are assembled together, as indicated in Fig. 4, a drainage chamber 21 is formed below the garbage holder drainage floor 11, and the same together with notches 15 afford a free passage for liquids from the garbage holder into the space 22 between the garbage holder and the liquid holder, over the rim of which liquid may overflow from the garbage holder into the pit which is of larger diameter than the liquid holder, that in turn is of larger diameter than the lower portion of the garbage holder, and of smaller diameter than the upper portion of such garbage holder which is of reduced diameter below its brim so that there is a free passage for liquid from the garbage holder and around the liquid holder to the drainage trap 6 and the garbage holder and its appendage, viz., the liquid holder, can be readily inserted into and withdrawn from the pit. The garbage holder and liquid holder with the floor 11 and the notches 15 thus constitute an efficient grease trap to prevent any grease which may reach the interior of the garbage holder from flowing to the trap 6.

Preferably the sink pan and pit may be of any customary sanitary construction, being in some instances made of porcelain-coated cast iron; and the hollow wall 7, liquid holder and foraminous drainage floor may be of some suitable non-corrodible easily cleaned material which is not liable to breakage and may, for instance, be copper, aluminum, tin, galvanized iron, enameled ware or the like.

In practice, the combined garbage holder and grease trap generally remains in place as a permanent part of the kitchen furniture and is never removed therefrom excepting temporarily for the purpose of emptying and cleaning said combined garbage holder and grease trap, and when thus removed the parts are readily detachable by simply turning the liquid holder to bring the inward projections 14 into notches 15. When the combined garbage holder and grease trap is removed from the pit, the pit is accessible for perfect cleansing, consequently all of the parts can be always kept perfectly clean and free from filthy or decomposed accumulations.

In practical use the attendant desiring to prepare a meal, may wash and pare vegetables in the garbage holder allowing the water to run freely from the faucet or hose, not shown, into the garbage holder and may drop the parings into the garbage holder, thus forming a clean and sanitary mat therein to receive and intercept other refuse that may be dropped into the holder. Other articles of food may also be prepared at the sink, and in the course of such preparation, whatever refuse there may be can be dropped into the garbage holder, and unless from the nature or excessive quantity of such refuse, it becomes desirable to immediately empty the garbage holder it may be allowed to remain in the pit until after the meal has been prepared and eaten and the dishes have been brought to the sink to be washed. Then by means of a hose attached to the faucet, not shown, or by any suitable means, the dishes may be drenched with hot water while being held over the garbage holder, thus depositing all refuse from the dishes on top of the vagetable parings or other refuse in the garbage holder, which refuse therefore becomes a protection to the water trapped by the liquid holder above the drainage floor, and intercepts the grease and holds most of it out of contact with the garbage holder. It is evident, however, that in case the garbage holder is empty when it is desired to drench refuse from dishes thereinto, that a charge of water, preferably cold, may be allowed to flow into the garbage holder and grease trap, thus filling the liquid holder and forming a protection to prevent grease from reaching the drainage floor and that in any case as soon as the liquid holder is filled with water no grease can escape from the garbage holder.

When the dishes have been washed the attendant will slip his fingers underneath the outwardly slanting bail and will lift the garbage holder by such bail, and in the course of removing the combined garbage holder and grease trap he will tilt the same sufficiently to drain from the drainage chamber the liquid contained therein, and for the purpose of facilitating such drainage the liquid holder is flaring and the notches 15 are of such number and appropriate location as to allow rapid drainage from the chamber 22 when the appliance is thus tilted.

It is to be observed that though the garbage holder may allow liquids to drain into the pit, it forms a practical closure for the pit to prevent solids from being swept thereinto from the sink pan floor, and that it is an easy matter to sweep such solids directly from the floor 2 into the garbage holder.

The liquid holder is shown as being of sufficient depth to allow its brim to extend above the bottom of the garbage holder to form the grease trap therewith and to hold the strainer immersed in water when the garbage holder is in the pit, even though the two holders were detached from each other and the liquid holder were supported by the floor of the pit while the garbage holder is suspended or otherwise supported in the pit. In case the garbage holder is at any time used in this detached form, care should be taken to let the garbage holder drip after removal from the pan before lifting it out of the sink to empty the contents.

The drainage pit 3 is preferably formed by a downward continuation of the sink pan 2 and its walls tend downward all the way from the bottom of the sink pan to the drainage means 6, so that there is always complete drainage from the drainage pit and liquids will not stand in said pit. Consequently, the level of the liquid inside the garbage holder 7 will not stand above the level at which the liquid flows off from the pan 12, the rim of which is outside the garbage holder 7 and within the drainage pit and above the level of the drainage outlet 6. There is thus produced means as the hollow wall 7 and the screen bottom 11 to hold the garbage, means as the pan 12 to hold water in a position to prevent escape of the grease and to prevent the grease from accumulating on the screen bottom 11; and the drainage pit 3 having the drainage outlet 6 arranged to receive the liquid from the edge of the pan and immediately carry it away, thus allowing all of the garbage or refuse in the hollow wall 7 above the level of the pan 12 to drain freely, the drainage means at the bottom of the pit being open to drain the liquid from the pit.

I claim:—

1. A portable garbage holder wall to be inserted into the pit of a sink and supported by its brim on the rim of the pit and forming a closure for solids at the mouth of the pit, a perforated member forming the bottom of said garbage holder wall, and a liquid holder removably attached to the bottom of the garbage holder and extending under the perforated member and terminating above the level of the perforated member, there being a drainage passage from the garbage holder wall to the rim of the liquid holder located below the perforated member for the purpose of draining the garbage holder and therewith forming a grease trap.

2. A portable garbage holder to be detachably mounted in the pit of a sink and practically forming a closure for the mouth of the pit and provided near its bottom with a perforated member, and a liquid holder removably attached to the bottom of the garbage holder to form a grease trap.

3. A garbage holder to be inserted into the pit of a sink, said garbage holder having a rounded brim resting on the rim of the pit and being contracted at its lower portion, and a liquid holder fastened to the bottom of the garbage holder and having a smaller outer periphery than the opening into the pit of the sink so that said liquid holder may be therewith insertible into and withdrawable from the pit.

4. The combination with a garbage holder to be inserted into the pit of a sink, said garbage holder having a perforated member near the bottom thereof, and a liquid holder removably attached to the bottom of the garbage holder and having its rim above such perforated member.

5. The combination with a garbage holder to be inserted into the pit of a sink, said garbage holder having a drainage outlet at its bottom, and a liquid holder extending below the bottom of the garbage holder and having its rim above such drainage outlet, said liquid holder being detachably fastened to the garbage holder and having its periphery of smaller diameter than the opening into the pit so that said liquid holder may be insertible into and removable from the pit with said garbage holder.

6. The combination with a garbage holder to be inserted into the pit of a sink, said garbage holder having a contracted lower portion and an outlet at the bottom, a liquid holder detachably fastened to the garbage holder, and a detachable drainage floor supported in and forming a screen for said outlet, said drainage floor being located below the level of the rim of said liquid holder.

7. The combination with a garbage holder to be inserted into the pit of a sink; said garbage holder comprising a drainage outlet at its bottom and a strainer above said outlet in said garbage holder; and a liquid holder detachably fastened to the garbage holder, said liquid holder extending below the bottom of the garbage holder and having its rim above said strainer.

In testimony whereof, I have hereunto set my hand at Los Angeles, California this 12th day of June 1913.

GEORGE H. BARKER.

In presence of—
 JAMES R. TOWNSEND,
 L. BELLE WEAVER.

Copies of this patent may be obtained for five cents each, by addressing the "Commissioner of Patents, Washington, D. C."